(12) United States Patent
Ogawa et al.

(10) Patent No.: US 11,424,074 B2
(45) Date of Patent: Aug. 23, 2022

(54) MULTILAYER CERAMIC CAPACITOR (71) Applicant: Murata Manufacturing Co., Ltd., Nagaokakyo (JP)

(72) Inventors: Yuya Ogawa, Nagaokakyo (JP); Shinya Isota, Nagaokakyo (JP); Shoichiro Suzuki, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 104 days.

(21) Appl. No.: 17/078,647

(22) Filed: Oct. 23, 2020

(65) Prior Publication Data

US 2021/0134527 A1 May 6, 2021

(30) Foreign Application Priority Data

Nov. 5, 2019 (JP) .............................. JP2019-200896

(51) Int. Cl.
H01G 4/12 (2006.01)
H01G 4/30 (2006.01)
C04B 37/00 (2006.01)
H01G 4/248 (2006.01)

(52) U.S. Cl.
CPC ......... *H01G 4/1209* (2013.01); *C04B 37/001* (2013.01); *H01G 4/248* (2013.01); *H01G 4/30* (2013.01); *C04B 2237/348* (2013.01)

(58) Field of Classification Search
CPC ........ H01G 4/30; H01G 4/012; H01G 4/1227; H01G 4/2325; H01G 4/1209; H01G 4/228; H01G 4/306; H01G 4/248; C04B 37/001; C04B 2237/348
See application file for complete search history.

(56) References Cited

U.S. PATENT DOCUMENTS

| | | | |
|---|---|---|---|
| 10,059,630 B2 | 8/2018 | Sakurai et al. | |
| 2001/0036054 A1* | 11/2001 | Chazono | H01G 4/1227 361/321.2 |
| 2006/0116273 A1 | 6/2006 | Ito et al. | |
| 2010/0014214 A1* | 1/2010 | Yamazaki | B32B 18/00 501/137 |
| 2010/0067171 A1* | 3/2010 | Yamazaki | H01G 4/30 361/321.4 |

(Continued)

FOREIGN PATENT DOCUMENTS

| | | |
|---|---|---|
| JP | 2014036140 A | 2/2014 |
| JP | 2017178686 A | 10/2017 |

(Continued)

*Primary Examiner* — Michael P McFadden
(74) *Attorney, Agent, or Firm* — ArentFox Schiff LLP (57) ABSTRACT A multilayer ceramic capacitor that includes a ceramic body including a stack of a plurality of dielectric layers and a plurality of internal electrodes; a first external electrode on a first end surface of the ceramic body and electrically connected to a first set of the plurality of internal electrodes; and a second external electrode on a second end surface of the ceramic body and electrically connected to a second set of the plurality of internal electrodes. The dielectric layer includes a plurality of dielectric grains including Ca, Zr, Ti and a rare earth element, P is present between the plurality of dielectric grains, and where at least a portion of the rare earth element is in a solid solution in the dielectric grains.

14 Claims, 2 Drawing Sheets (56) References Cited

U.S. PATENT DOCUMENTS

| | | | |
|---|---|---|---|
| 2010/0165541 A1* | 7/2010 | Sasabayashi | H01B 3/12 |
| | | | 361/313 |
| 2010/0214717 A1* | 8/2010 | Nakamura | H01G 4/30 |
| | | | 361/313 |
| 2014/0043722 A1 | 2/2014 | Hirata et al. | |
| 2014/0098455 A1 | 4/2014 | Kang et al. | |
| 2017/0178812 A1* | 6/2017 | Shimada | C04B 35/4682 |
| 2017/0283328 A1 | 10/2017 | Sakurai et al. | |
| 2017/0316883 A1 | 11/2017 | Yamaguchi | |
| 2019/0237256 A1* | 8/2019 | Takano | C01G 23/006 |
| 2020/0161048 A1* | 5/2020 | Chun | H01G 4/1227 |

FOREIGN PATENT DOCUMENTS

| | | |
|---|---|---|
| JP | 2018020931 A | 2/2018 |
| KR | 20060061245 A | 6/2006 |
| KR | 20140044609 A | 4/2014 |
| KR | 20170123273 A | 11/2017 |

\* cited by examiner

MULTILAYER CERAMIC CAPACITOR

CROSS REFERENCE TO RELATED APPLICATIONS

The present application claims priority to Japanese Patent Application No. 2019-200896, filed Nov. 5, 2019, the entire contents of which are incorporated herein by reference.

BACKGROUND OF THE INVENTION

Field of the Invention

The present invention relates to a multilayer ceramic capacitor.

Description of the Background Art

Conventionally, multilayer ceramic capacitors include a ceramic body having a stack of a plurality of dielectric layers and a plurality of internal electrodes and having a pair of major surfaces opposite to each other in a layer stacking direction, a pair of side surfaces opposite to each other in a widthwise direction orthogonal to the layer stacking direction, and a pair of end surfaces opposite to each other in a lengthwise direction orthogonal to the layer stacking direction and the widthwise direction, and external electrodes electrically connected to the internal electrodes and provided on the pair of end surfaces of the ceramic body, respectively.

Japanese Patent Laid-Open No. 2017-178686 describes, as an example of a multilayer ceramic capacitor having such a structure, a multilayer ceramic capacitor described as having a good IR characteristic and a satisfactory high temperature load life even when it is exposed to high electric field strength.

In recent years, multilayer ceramic capacitors are increasingly miniaturized, and accordingly, dielectric powder used to form a dielectric layer is also required to be finer.

SUMMARY OF THE INVENTION

However, the dielectric powder has grains grown due to heat applied during a process for manufacturing the multilayer ceramic capacitor, and it is thus difficult to make the dielectric powder finer. Therefore, it is difficult to reduce the thickness of the dielectric layer of the multilayer ceramic capacitor.

The present invention has been made to overcome the above problem and contemplates a multilayer ceramic capacitor including a dielectric layer that can be a thin layer.

A multilayer ceramic capacitor according to the present invention comprises: a ceramic body including a stack of a plurality of dielectric layers and a plurality of internal electrodes and having a first major surface and a second major surface opposite to each other in a layer stacking direction, a first side surface and a second side surface opposite to each other in a widthwise direction orthogonal to the layer stacking direction, and a first end surface and a second end surface opposite to each other in a lengthwise direction orthogonal to the layer stacking direction and the widthwise direction; a first external electrode on the first end surface of the ceramic body and electrically connected to a first set of the plurality of internal electrodes; and a second external electrode on the second end surface of the ceramic body and electrically connected to a second set of the plurality of internal electrodes, wherein the dielectric layer includes a plurality of dielectric grains including Ca, Zr, Ti and a rare earth element, P is present between the plurality of dielectric grains, and where at least a portion of the rare earth element is in a solid solution in the dielectric grains.

According to the multilayer ceramic capacitor of the present invention, the dielectric grains' grain growth can be suppressed in a heating step included in a process for manufacturing the multilayer ceramic capacitor, and the dielectric layer can thus be a thin layer. This allows the dielectric layer to be made of multiple layers for a given size, and increased capacitance can be obtained.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Hereinafter, a feature of the present invention will be specifically described with reference to an embodiment of the present invention.

Figure 1:
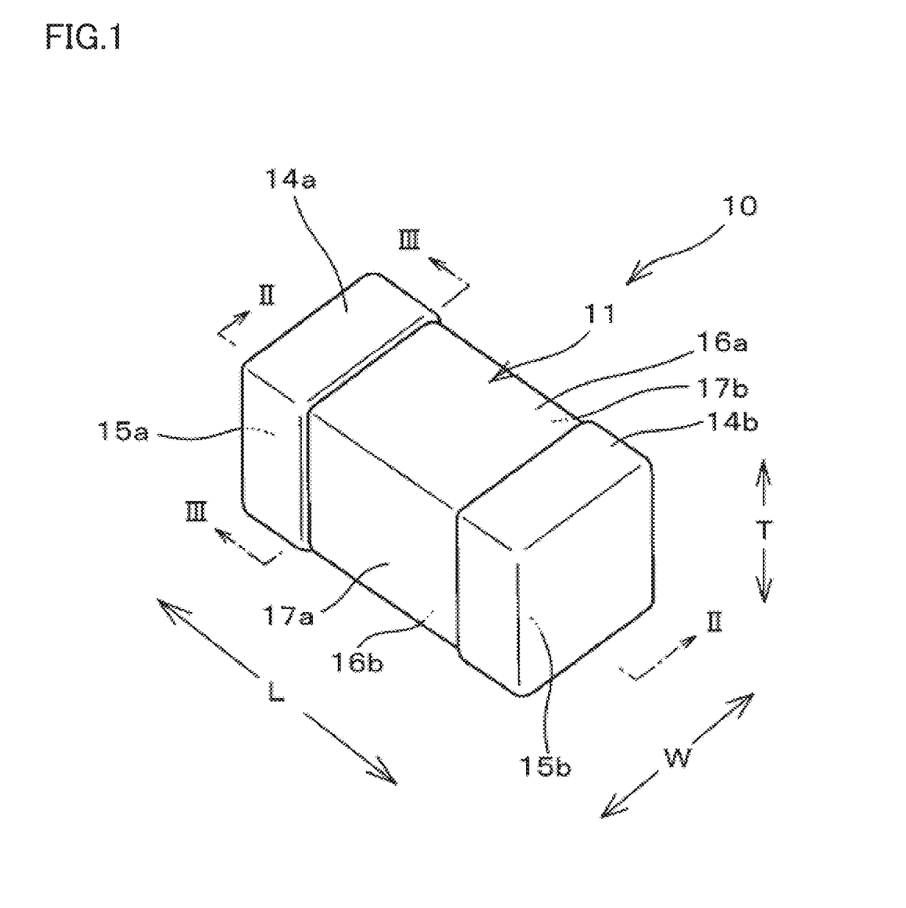
FIG. 1 is a perspective view of a multilayer ceramic capacitor according to an embodiment.
Figure 2:
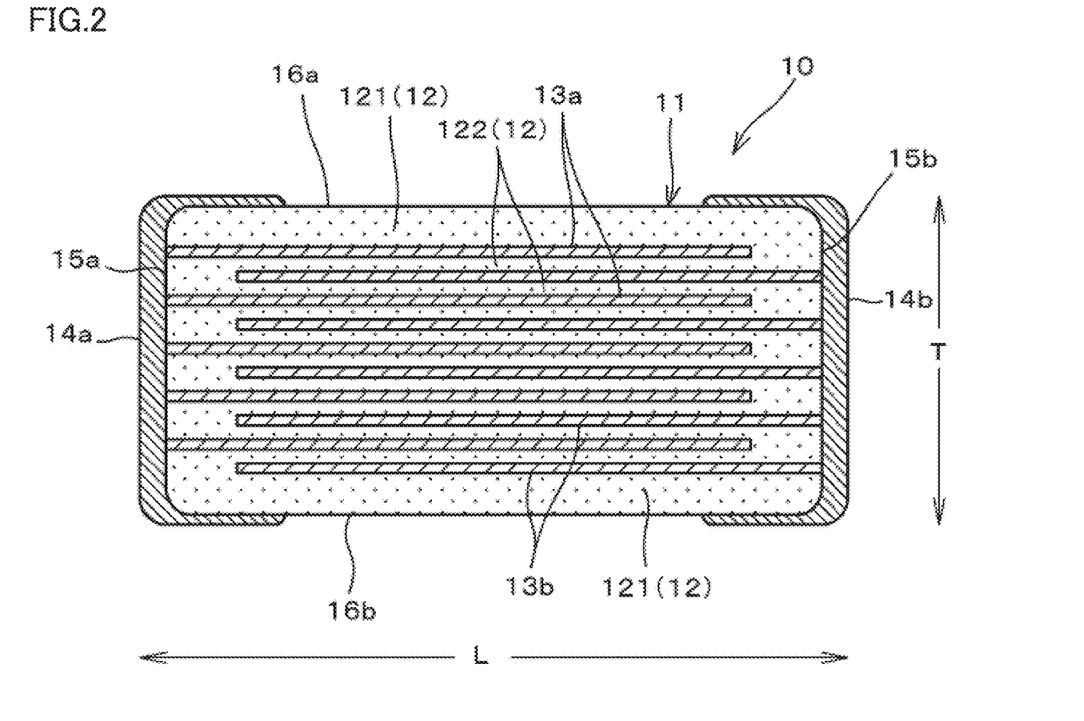
FIG. 2 is a cross section of the multilayer ceramic capacitor shown in FIG. 1 taken along a line II-II.
Figure 3:
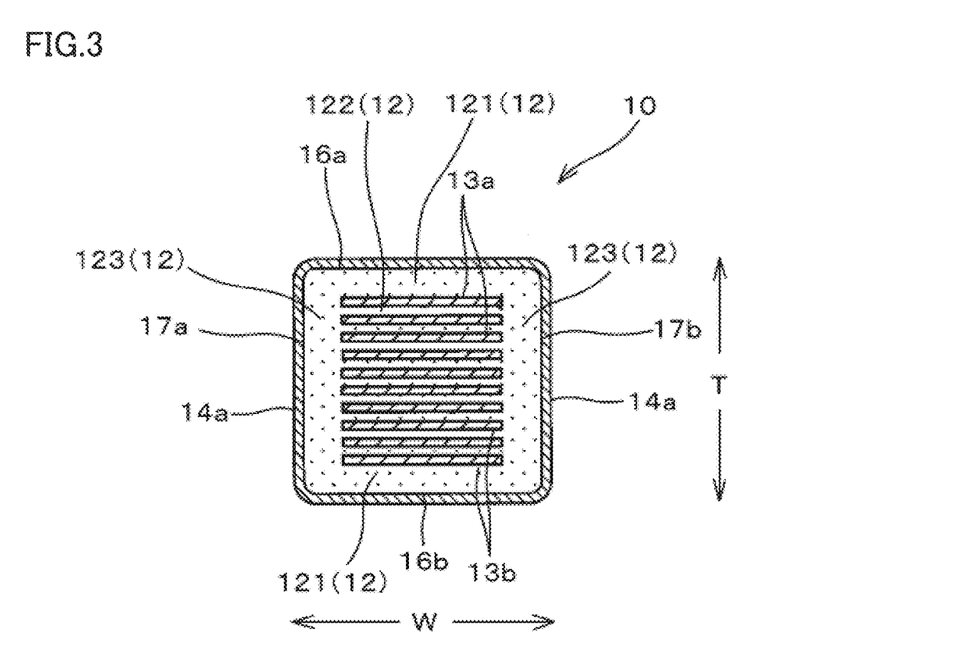
FIG. 3 is a cross section of the multilayer ceramic capacitor shown in FIG. 1 taken along a line III-III.

FIG. 1 is a perspective view of a multilayer ceramic capacitor 10 according to an embodiment. FIG. 2 is a cross section of multilayer ceramic capacitor 10 shown in FIG. 1 taken along a line II-II. FIG. 3 is a cross section of multilayer ceramic capacitor 10 shown in FIG. 1 taken along a line III-III.

As shown in FIGS. 1 to 3, multilayer ceramic capacitor 10 is an electronic component generally in the form of a rectangular parallelepiped, and includes a ceramic body 11 and a pair of external electrodes 14a and 14b. As shown in FIG. 1, the paired external electrodes 14a and 14b are disposed opposite to each other.

Herein, a direction in which the paired external electrodes 14a and 14b are opposite to each other is defined as a lengthwise direction L of multilayer ceramic capacitor 10, a direction in which dielectric layer 12 and internal electrodes 13a and 13b described hereinafter are stacked is defined as a layer stacking direction T, and a direction orthogonal to both lengthwise direction L and layer stacking direction T is defined as a widthwise direction W. Any two of lengthwise direction L, layer stacking direction T, and widthwise direction W are orthogonal to each other.

Ceramic body 11 has a first end surface 15a and a second end surface 15b opposite to each other in lengthwise direction L, a first major surface 16a and a second major surface 16b opposite to each other in layer stacking direction T, and a first side surface 17a and a second side surface 17b opposite to each other in widthwise direction W.

Ceramic body 11 preferably has rounded corners and ridges. As referred to herein, a corner is a portion where three surfaces of ceramic body 11 meet, and a ridge is a portion where two surfaces of ceramic body 11 meet.

As shown in FIGS. 2 and 3, ceramic body 11 includes a stack of a plurality of dielectric layers 12 and a plurality of internal electrodes 13a and 13b. Internal electrodes 13a, 13b include a first internal electrode 13a and a second internal electrode 13b. More specifically, ceramic body 11 has a structure in which more than one first internal electrode 13a and more than one second internal electrode 13b are alternately stacked in layer stacking direction T with dielectric layer 12 interposed therebetween.

As shown in FIG. 3, dielectric layer 12 includes an outer dielectric layer 121 located on an outermost side in layer stacking direction T than internal electrodes 13a and 13b located on an outermost side in layer stacking direction T, an inner dielectric layers 122 located between two internal electrodes 13a and 13b adjacent to each other in layer stacking direction T, and a margin portion 123 which is a region free of internal electrodes 13a and 13b when ceramic body 11 is viewed in layer stacking direction T.

More specifically, outer dielectric layer 121 is a layer located between internal electrodes 13a and 13b located on the outermost side in layer stacking direction T and first and second major surfaces 16a and 16b of ceramic body 11. Inner dielectric layer 122 is a layer located between first internal electrode 13a and second internal electrode 13b adjacent to each other in layer stacking direction T. Margin portion 123 is located on a side outer than outer dielectric layer 121 and inner dielectric layer 122 in widthwise direction W.

In the process for manufacturing multilayer ceramic capacitor 10, margin portion 123 may be formed integrally with or separately from inner dielectric layer 122. When margin portion 123 is formed separately from inner dielectric layer 122, for example, ceramic green sheets each having an internal electrode pattern formed thereon can be stacked in layers and a ceramic green sheet can subsequently be attached outside in widthwise direction W and fired to form margin portion 123. In this case, a physical boundary exists between a multilayer body including outer dielectric layer 121, internal electrodes 13a and 13b and inner dielectric layer 122, and margin portion 123.

Dielectric layer 12 includes a plurality of dielectric grains including Ca, Zr, Ti and a rare earth element, P between the plurality of dielectric grains, and where at least a portion of the rare earth element is in a solid solution in the dielectric grains. P is present at a grain boundary triple junction of at least three dielectric grains and a grain boundary.

P being present at least at a grain boundary triple junction and a grain boundary means that P is present at at least one of a plurality of existing grain boundary triple junctions and at least one of a plurality of existing grain boundaries. Whether P is present at a grain boundary triple junction and a grain boundary can be examined by using a wavelength dispersive x-ray (WDX) spectrometer or a transmission electron microscope (TEM). In particular, when a transmission electron microscope is used, P can be detected through sectioning to an extent of about 50 nm.

Multilayer ceramic capacitor 10 according to the present embodiment comprises dielectric layer 12 including P, and a heating step included in a process for manufacturing multilayer ceramic capacitor 10 can be performed while grain growth of dielectric grains is suppressed. This allows dielectric layer 12 to be a thin layer, which in turn allows dielectric layer 12 to be made of multiple layers for a given size and hence the capacitor can have an increased capacitance.

Further, at least a portion of a rare earth element forms a solid solution in the dielectric grains included in dielectric layer 12, and even when dielectric layer 12 is a thin layer, reduction in insulation resistance of multilayer ceramic capacitor 10 can be suppressed, and reliability can be improved. Note that it has been confirmed through an experiment that when multilayer ceramic capacitor 10 of the present embodiment in which at least a portion of a rare earth element forms a solid solution in dielectric grains is compared with a multilayer ceramic capacitor in which a rare earth element does not form a solid solution in dielectric grains, the former has an IR characteristic less likely to be deteriorated when heated at a high temperature.

The rare earth element is preferably at least one of La, Ce, Pr, Pm, Sm, Eu, Tb, Gd, Nd, Dy, Ho, and Y. Inter alia, La has a large ionic radius and tends to easily form a solid solution in the dielectric grains, and La is thus more preferably used as the rare earth element included in the dielectric grains.

Dielectric layer 12 preferably includes, relative to 100 parts by mole of Zr: Ca in an amount of 70 parts by mole to 107 parts by mole; Sr in an amount of 0 parts by mole to 26 parts by mole; the rare earth element in an amount of 0.1 parts by mole to 5 parts by mole; the Ti in an amount of 0.1 parts by mole to 6 parts by mole; Hf in an amount of 1 part by mole to 3 parts by mole; and the P in an amount of 0.001 parts by mole to 11 parts by mole. By controlling an amount of each element included in dielectric layer 12 to fall within the above-described range, multilayer ceramic capacitor 10 having a desired temperature characteristic, for example, a characteristic satisfying a COG characteristic according to the EIA standard can be obtained.

When the content of P is less than 0.001 part by mole relative to 100 parts by mole of Zr, it is difficult to effectively suppress grain growth during firing as P is bonded to Ca and Zr, whereas when the content of P is more than 11 parts by mole relative to 100 parts by mole of Zr, it impairs crystallinity and hence a characteristic of multilayer ceramic capacitor 10.

When dielectric layer 12 includes a rare earth element, there is a possibility that multilayer ceramic capacitor 10 cannot obtain a desired temperature characteristic. Accordingly, dielectric layer 12 preferably includes Sr to obtain the desired temperature characteristic. Dielectric layer 12 may not include Sr, however, insofar as the desired temperature characteristic is obtained.

Dielectric layer 12 preferably further includes Si and Mn. In that case, the content of Si is preferably 0.1 parts by mole to 5.0 parts by mole relative to 100 parts by mole of Zr, and the content of Mn is preferably 0.2 parts by mole to 5.0 parts by mole. Si and Mn function as a sintering aid, and dielectric layer 12 including 0.1 to 5.0 parts by mole of Si and 0.2 to 5.0 parts by mole of Mn relative to 100 parts by mole of Zr allows multilayer ceramic capacitor 10 to be manufactured through sintering at a lower firing temperature. High firing temperature may have a negative effect on internal electrodes 13a, 13b, and sinterability at a lower firing temperature can suppress the negative effect on internal electrodes 13a, 13b.

When the contents of Si and Mn are larger than the upper limit values indicated above, excessive grain growth occurs, and multilayer ceramic capacitor 10 will be impaired in reliability. On the other hand, when the contents of Si and Mn are smaller than the lower limit values indicated above, some dielectric grains would not have grain growth.

The composition of the elements included in dielectric layer 12 described above can be measured through X-ray fluorescence (XRF) spectrometry, inductively coupled plasma (ICP) emission spectroscopy, or the like. The amount of the solid solution of La can be examined with the transmission electron microscope indicated above.

Of dielectric layer 12, inner dielectric layer 122 has a dimension of 0.3 μm to 3.0 μm in layer stacking direction T.

Herein, inner dielectric layer 122 can be measured in thickness in the following method: Initially, multilayer ceramic capacitor 10 has a plane that is defined by layer stacking direction T and widthwise direction W polished to reach a central position in multilayer ceramic capacitor 10 in lengthwise direction L to thus expose a cross section which is in turn observed with a scanning electron microscope. Subsequently, in the exposed cross section, inner dielectric layer 122 located at a central portion in layer stacking direction T is measured in thickness on a center line in widthwise direction W extending in layer stacking direction T and two equidistant lines drawn on either side of the center line in widthwise direction W and extending in layer stacking directing T for a total of five lines. An average value of these five measured values is defined as the thickness of inner dielectric layer 122.

In order to obtain the thickness more accurately, ceramic body 11 is divided into an upper portion, a central portion, and a lower portion in layer stacking direction T, the above-described five measurement values are obtained in each of the upper portion, the central portion, and the lower portion, and an average value of all the obtained measurement values is defined as the thickness of inner dielectric layer 122.

First internal electrode 13a is drawn out to first end surface 15a of ceramic body 11. Second internal electrode 13b is drawn out to second end surface 15b of ceramic body 11.

In addition to first internal electrode 13a and second internal electrode 13b, ceramic body 11 may include an internal electrode which is not exposed at a surface.

First internal electrode 13a includes an opposite electrode portion which is a portion opposite to second internal electrode 13b, and a lead electrode portion which is a portion extending from the opposite electrode portion to first end surface 15a of ceramic body 11. Second internal electrode 13b includes an opposite electrode portion which is a portion opposite to first internal electrode 13a, and a lead electrode portion which is a portion extending from the opposite electrode portion to second end surface 15b of ceramic body 11.

The opposite electrode portion of first internal electrode 13a and the opposite electrode portion of second internal electrode 13b are opposite to each other with dielectric layer 12 interposed to form a capacitance, and thus function as a capacitor.

First internal electrode 13a and second internal electrode 13b contain, for example, metals such as Ni, Cu, Ag, Pd and Au, or an alloy of Ag and Pd or the like. First internal electrode 13a and second internal electrode 13b preferably include as a co-material a ceramic material identical to a dielectric ceramic material included in dielectric layer 12.

First external electrode 14a is formed throughout first end surface 15a of ceramic body 11 and is also formed so as to extend from first end surface 15a to first major surface 16a, second major surface 16b, first side surface 17a, and second side surface 17b. First external electrode 14a is electrically connected to first internal electrode 13a.

Second external electrode 14b is formed throughout second end surface 15b of ceramic body 11 and is also formed so as to extend from second end surface 15b to first major surface 16a, second major surface 16b, first side surface 17a, and second side surface 17b. Second external electrode 14b is electrically connected to second internal electrode 13b.

First external electrode 14a contains a metal such as Ni, Cu, Ag, Pd, Ag—Pd alloy, or Au. First external electrode 14a preferably includes as a co-material a ceramic material identical to the dielectric ceramic material included in dielectric layer 12. When first external electrode 14a including the co-material is fired, it can shrink in a manner similar to that in which ceramic body 11 shrinks, and first external electrode 14a can be prevented from peeling off ceramic body 11.

Second external electrode 14b contains a metal such as Ni, Cu, Ag, Pd, Ag—Pd alloy, or Au. Second external electrode 14b preferably includes as a co-material a ceramic material identical to the dielectric ceramic material included in dielectric layer 12. When second external electrode 14b including the co-material is fired, it can shrink in a manner similar to that in which ceramic body 11 shrinks, and second external electrode 14b can be prevented from peeling off ceramic body 11.

What type of element is contained in first external electrode 14a and second external electrode 14b can be examined by performing an elemental analysis through transmission electron microscopy-energy dispersive X-ray spectroscopy (TEM-EDX).

When first external electrode 14a and second external electrode 14b are configured as a Ni layer, the Ni layer preferably contains a ceramic material in an amount of 25% by area to 40% by area. The Ni layer containing a ceramic material in an amount of 25% by area or more means that the Ni layer includes the ceramic material in a determined amount or more. The Ni layer including the ceramic material in a determined amount or more can be formed by firing an external electrode paste simultaneously when an unfired ceramic body is fired. The Ni layer preferably contains the ceramic material in an amount of 35% by area or less.

The content of the ceramic material in the Ni layer can be measured in a method through WDX, as follows: Initially, a cross section of a central portion of multilayer ceramic capacitor 10 in widthwise direction W is exposed, and a central portion in dimension in thickness of the Ni layer at a central portion of ceramic body 11 in layer stacking direction T is enlarged to 10,000 times. The field of view of the enlarged area is 6 μm×8 μm. The enlarged area is mapped through WDX, and an areal ratio is measured from an image obtained through the mapping.

First external electrode 14a preferably includes a Ni layer, a first plating layer, and a second plating layer in this order from the side of first end surface 15a of ceramic body 11. Similarly, second external electrode 14b preferably includes a Ni layer, a first plating layer, and a second plating layer in this order from the side of second end surface 15b of ceramic body 11. The first plating layer is preferably formed by Ni plating, and the second plating layer is preferably formed by Sn plating. The Ni plating functions to prevent the Ni layer from being eroded by solder when mounting multilayer ceramic capacitor 10. The Sn plating functions to improve wettability of solder when mounting multilayer ceramic capacitor 10.

Further, a conductive resin layer containing conductive particles and a resin may be included between the Ni layer and the first plating layer. In that case, as the conductive particles, for example, metal particles such as Cu particles, Ag particles, and Ni particles can be used.

Multilayer ceramic capacitor 10 can for example have any of first to third sizes (a) to (c) indicated below:

(a) first size: multilayer ceramic capacitor 10 has a dimension of 0.35 mm to 0.65 mm in layer stacking direction T, a dimension of 0.35 mm to 0.65 mm in widthwise direction W, and a dimension of 0.85 mm to 1.15 mm in lengthwise direction L;

(b) second size: multilayer ceramic capacitor 10 has a dimension of 1.45 mm to 1.70 mm in layer stacking direction T, a dimension of 1.45 mm to 1.70 mm in widthwise direction W, and a dimension of 3.05 mm to 3.35 mm in lengthwise direction L; and (c) third size: multilayer ceramic capacitor 10 has a dimension of 2.35 mm to 2.65 mm in layer stacking direction T, a dimension of 2.35 mm to 2.65 mm in widthwise direction W, and a dimension of 3.05 mm to 3.35 mm in lengthwise direction L.

Multilayer ceramic capacitor 10 of the first size for example includes 100 to 550 internal electrodes including first internal electrode 13a and second internal electrode 13b.

Multilayer ceramic capacitor 10 of the second size for example includes 230 to 830 internal electrodes including first internal electrode 13a and second internal electrode 13b.

Multilayer ceramic capacitor 10 of the third size for example includes 230 to 1,520 internal electrodes including first internal electrode 13a and second internal electrode 13b.

Multilayer ceramic capacitor 10 described above comprises dielectric layer 12 including dielectric grains having an average grain diameter for example of 100 nm or more and a size of 80% or less of a dimension of dielectric layer 12 in layer stacking direction T.

The average grain diameter of the dielectric grains can be determined in the following method. Initially, multilayer ceramic capacitor 10 has a plane that is defined by layer stacking direction T and lengthwise direction L polished to reach a central position in multilayer ceramic capacitor 10 in widthwise direction W to thus expose a cross section. The exposed cross section is imaged with a scanning electron microscope at a magnification of 5,000 times, with an acceleration voltage of 15 kV applied, in a field of view of 30 μm×30 μm, and image processing software is used to recognize any dielectric grain's edge and calculate its area, and this area is regarded as an area of a circle to calculate a diameter. A diameter of any dielectric grain included in the imaged range excluding any incompletely imaged dielectric grain is measured and an average value of such diameters is defined as an average grain diameter of the dielectric grains.

<Method for Manufacturing Multilayer Ceramic Capacitor>

An example of a method for manufacturing multilayer ceramic capacitor 10 described above will now be described below.

Initially, primary raw materials each including one of Ca, Zr, Ti, and a rare earth element are prepared, weighed so as to have a predetermined blending ratio, and then introduced into a pot, and a predetermined amount of binder liquid is also introduced into the pot and together agitated and pulverized. The primary raw materials may further include Sr and Hf.

Subsequently, secondary raw materials each including one of Si and Mn are prepared, weighed so as to have a predetermined blending ratio, and then introduced into the pot, and a predetermined amount of binder liquid is also introduced into the pot and together agitated and pulverized to prepare a ceramic slurry.

Subsequently, the ceramic slurry is applied on a resin film to prepare a ceramic green sheet. Then, an internal electrode pattern is formed by printing a conductive paste on the ceramic green sheet for an internal electrode. The conductive paste for the internal electrode can be a known conductive paste including an organic binder and an organic solvent. The conductive paste for the internal electrode may be printed in a printing method such as screen printing or gravure printing.

Subsequently, a predetermined number of ceramic green sheets on which the internal electrode pattern is not formed are stacked in layers, and thereon, ceramic green sheets each having the internal electrode pattern formed thereon are sequentially stacked in layers, and thereon, a predetermined number of ceramic green sheets on which the internal electrode pattern is not formed are stacked in layers to thus prepare a mother multilayer body.

Subsequently, the mother multilayer body is pressed in the layer stacking direction mechanically, hydrostatically, or the like, and then cut into a predetermined size in a cutting method such as press-cutting, dicing or a laser to obtain a multilayer chip. The multilayer chip may subsequently be barreled or similarly polished to have a corner and a ridge rounded.

Subsequently, the multilayer chip is fired to produce a ceramic body. The multilayer chip is fired at a temperature for example of 900° C. to 1400° C., although it depends on the ceramic material, the material of the conductive paste and the like that are used.

Subsequently, a conductive paste for the external electrode is applied to both end surfaces, a portion of both major surfaces and a portion of both side surfaces of the ceramic body. Then, the ceramic body with the conductive paste applied thereto for the external electrode is baked. Finally, if necessary, a plating layer is formed on a surface of the baked electrode layer.

Through the above-described process, multilayer ceramic capacitor 10 can be manufactured.

While in the above-described manufacturing process the conductive paste for the external electrode is applied to the ceramic body after it is fired, the conductive paste for the external electrode may be applied to the ceramic body before it is fired, and the conductive paste for the external electrode and the ceramic body may be fired simultaneously.

Example 1

Twenty-seven types of multilayer ceramic capacitors having different composition ratios of Ca, Zr, Ti, a rare earth element, Sr, Hf, and P included in dielectric layer 12 were fabricated, and whether the multilayer ceramic capacitors satisfied the COG characteristic according to the EIA standard and were reliable was examined. La was used as the rare earth element.

Table 1 shows a composition ratio of each element included in dielectric layer 12 of the 27 types of multilayer ceramic capacitors of Sample Nos. 1 to 27. Table 1 indicates each element's parts by mole relative to 100 parts by mole of Zr. Among the multilayer ceramic capacitors of Sample Nos. 1 to 27, the multilayer ceramic capacitors of Sample Nos. 1 to 12, 15 to 18, and 20 to 27 are multilayer ceramic capacitors of the present embodiment and satisfy the requirement "the dielectric layer includes a plurality of dielectric grains including Ca, Zr, Ti and a rare earth element, and P present between the plurality of dielectric grains, and at least a portion of the rare earth element forms a solid solution in the dielectric grains."

TABLE 1

| sample nos. | Ca | Sr | La | Zr | Ti | Hf | P | Si | Mn | COG characteristic for 125° C. | reliability (NG ratio) |
|---|---|---|---|---|---|---|---|---|---|---|---|
| 1 | 107.0 | 0 | 0.1 | 100 | 0.1 | 2.0 | 1.5 | 2.5 | 3.0 | 26 | 7/100 |
| 2 | 95.2 | 0 | 0.1 | 100 | 0.1 | 2.0 | 1.5 | 2.5 | 3.0 | 13 | 10/100 |
| 3 | 100.0 | 1.0 | 0.1 | 100 | 1.0 | 2.0 | 1.5 | 2.5 | 3.0 | 4 | 11/100 |
| 4 | 103.1 | 2.1 | 1.0 | 100 | 3.1 | 2.0 | 1.5 | 2.5 | 3.0 | −10 | 13/100 |
| 5 | 97.1 | 6.3 | 1.0 | 100 | 4.2 | 2.0 | 1.5 | 2.5 | 3.0 | −25 | 9/100 |
| 6 | 75.3 | 23.2 | 1.4 | 100 | 5.0 | 2.0 | 1.5 | 2.5 | 3.0 | −29 | 12/100 |
| 7 | 108.4 | 0 | 0.1 | 100 | 0.1 | 2.0 | 1.5 | 2.5 | 3.0 | 35 | 7/100 |
| 8 | 68.4 | 26.7 | 1.4 | 100 | 5.0 | 2.0 | 1.5 | 2.5 | 3.0 | −32 | 5/100 |
| 9 | 69.1 | 24.9 | 1.4 | 100 | 7.3 | 2.0 | 1.5 | 2.5 | 3.0 | −44 | 8/100 |
| 10 | 70.0 | 26.0 | 2.8 | 100 | 6.0 | 2.0 | 1.5 | 2.5 | 3.0 | −26 | 11/100 |
| 11 | 70.3 | 24.5 | 5.0 | 100 | 6.0 | 2.0 | 1.5 | 2.5 | 3.0 | −18 | 9/100 |
| 12 | 67.4 | 29.2 | 7.2 | 100 | 8.3 | 2.0 | 1.5 | 2.5 | 3.0 | −33 | 14/100 |
| 13 | 107.0 | 0 | 0 | 100 | 0.1 | 2.0 | 1.5 | 2.5 | 3.0 | 37 | 9/100 |
| 14 | 107.0 | 0 | 0.1 | 100 | 0 | 2.0 | 1.5 | 2.5 | 3.0 | 31 | 9/100 |
| 15 | 100.0 | 1.0 | 0.1 | 100 | 1.0 | 0.7 | 1.5 | 2.5 | 3.0 | 44 | 15/100 |
| 16 | 100.0 | 1.0 | 0.1 | 100 | 1.0 | 3.5 | 1.5 | 2.5 | 3.0 | 42 | 16/100 |
| 17 | 100.0 | 1.0 | 0.1 | 100 | 1.0 | 1.0 | 1.5 | 2.5 | 3.0 | 4 | 10/100 |
| 18 | 100.0 | 1.0 | 0.1 | 100 | 1.0 | 3.0 | 1.5 | 2.5 | 3.0 | 4 | 7/100 |
| 19 | 100.0 | 1.0 | 0.1 | 100 | 1.0 | 2.0 | 0.0 | 2.5 | 3.0 | 5 | 97/100 |
| 20 | 100.0 | 1.0 | 0.1 | 100 | 1.0 | 2.0 | 0.001 | 2.5 | 3.0 | 5 | 15/100 |
| 21 | 100.0 | 1.0 | 0.1 | 100 | 1.0 | 2.0 | 3.8 | 2.5 | 3.0 | 5 | 3/100 |
| 22 | 100.0 | 1.0 | 0.1 | 100 | 1.0 | 2.0 | 6.3 | 2.5 | 3.0 | 5 | 8/100 |
| 23 | 100.0 | 1.0 | 0.1 | 100 | 1.0 | 2.0 | 8.7 | 2.5 | 3.0 | 5 | 10/100 |
| 24 | 100.0 | 1.0 | 0.1 | 100 | 1.0 | 2.0 | 9.8 | 2.5 | 3.0 | 5 | 9/100 |
| 25 | 100.0 | 1.0 | 0.1 | 100 | 1.0 | 2.0 | 10.7 | 2.5 | 3.0 | 5 | 16/100 |
| 26 | 100.0 | 1.0 | 0.1 | 100 | 1.0 | 2.0 | 11.0 | 2.5 | 3.0 | 5 | 17/100 |
| 27 | 100.0 | 1.0 | 0.1 | 100 | 1.0 | 2.0 | 12.1 | 2.5 | 3.0 | 5 | 54/100 |

Whether the multilayer ceramic capacitors of Sample Nos. 1 to 27 shown in Table 1 are reliable was examined in the following method. That is, at 150° C. a voltage of 200 V was applied to a sample for 500 hours and when the sample had a value in resistance reduced by a square of 10 the sample was determined as a failure. The multilayer ceramic capacitor of Sample No. 19 in which the dielectric layer did not include P had 97 samples failed out of 100 samples, whereas other multilayer ceramic capacitors in which P was included had a small number of samples determined as a failure. It is thus preferable that the dielectric layer include P.

A multilayer ceramic capacitor having a temperature coefficient, which is indicated in table 2, of −30 ppm/° C. to 30 ppm/° C. satisfies the COG characteristic according to the EIA standard. As shown in Table 2, of the multilayer ceramic capacitors of Sample Nos. 1 to 18 and 20 to 27 in which the dielectric layer included P, the multilayer ceramic capacitors of Sample Nos. 1-6, 10-11, 17-18 and 20 to 27 had a temperature characteristic satisfying the COG characteristic according to the EIA standard. Of these multilayer ceramic capacitors, Sample Nos. 1-6, 10-11, 17-18 and 20-26 in which Ca is included in an amount of 70 parts by mole to 107 parts by mole, Sr is included in an amount of 0 parts by mole to 26 parts by mole, La is included in an amount of 0.1 parts by mole to 5 parts by mole, Ti is included in an amount of 0.1 parts by mole to 6 parts by mole, Hf is included in an amount of 1 part by mole to 3 parts by mole, and P is included in an amount of 0.001 parts by mole to 11 parts by mole relative to 100 parts by mole of Zr obtained a temperature characteristic satisfying the COG characteristic, and were also highly reliable according to a reliability evaluation as they each had 17 or less samples determined as a failure out of 100 samples. Therefore, dielectric layer 12 preferably includes 70 to 107 parts by mole of Ca, 0 to 26 parts by mole of Sr, 0.1 to 5 parts by mole of La, 0.1 to 6 parts by mole of Ti, 1 to 3 parts by mole of Hf, and 0.001 to 11 parts by mole of P relative to 100 parts by mole of Zr.

Example 2

Fifteen types of multilayer ceramic capacitors comprising dielectric layer 12 including Ca, Sr, a rare earth element, Zr, Ti, P, Si, and Mn and having Si and Mn contents different from each other were manufactured, and whether they were stable in fireability when they were manufactured and whether they were reliable were examined. Table 2 shows each element's composition ratio, stability in fireability, and reliability.

TABLE 2

| sample nos. | Ca | Sr | La | Zr | Ti | Hf | P | Si | Mn | stability fireability | reliability (NG ratio) |
|---|---|---|---|---|---|---|---|---|---|---|---|
| 31 | 100.0 | 2.0 | 1.0(La) | 100.0 | 3.0 | 1.5 | 1.3 | 1.5 | | positive | 3/100 |
| 32 | 100.0 | 2.0 | 1.0(La) | 100.0 | 3.0 | 1.5 | 5.0 | 1.0 | | positive | 7/100 |
| 33 | 100.0 | 2.0 | 1.0(La) | 100.0 | 3.0 | 1.5 | 1.0 | 5.0 | | positive | 9/100 |
| 34 | 100.0 | 2.0 | 1.0(La) | 100.0 | 3.0 | 1.5 | 2.5 | 3.0 | | positive | 2/100 |
| 35 | 100.0 | 2.0 | 1.0(La) | 100.0 | 3.0 | 1.5 | 2.5 | 4.0 | | positive | 6/100 |
| 36 | 100.0 | 2.0 | 1.0(La) | 100.0 | 3.0 | 1.5 | 0 | 3.2 | | negative | 93/100 |
| 37 | 100.0 | 2.0 | 1.0(La) | 100.0 | 3.0 | 1.5 | 0.1 | 3.0 | | positive | 13/100 |
| 38 | 100.0 | 2.0 | 1.0(La) | 100.0 | 3.0 | 1.5 | 5.7 | 2.8 | | negative | 70/100 |

TABLE 2-continued

| sample nos. | Ca | Sr | La | Zr | Ti | Hf | P | Si | Mn | stability fireability | reliability (NG ratio) |
|---|---|---|---|---|---|---|---|---|---|---|---|
| 39 | 100.0 | 2.0 | 1.0(La) | 100.0 | 3.0 | 1.5 | 2.6 | 0 | | negative | 83/100 |
| 40 | 100.0 | 2.0 | 1.0(La) | 100.0 | 3.0 | 1.5 | 2.8 | 0.2 | | positive | 10/100 |
| 41 | 100.0 | 2.0 | 1.0(La) | 100.0 | 3.0 | 1.5 | 2.4 | 6.3 | | negative | 35/100 |
| 42 | 100.0 | 2.0 | 1.0(Gd) | 100.0 | 3.0 | 1.5 | 1.3 | 1.5 | | positive | 1/100 |
| 43 | 100.0 | 2.0 | 1.0(Nd) | 100.0 | 3.0 | 1.5 | 1.3 | 1.5 | | positive | 8/100 |
| 44 | 100.0 | 2.0 | 1.0(Dy) | 100.0 | 3.0 | 1.5 | 1.3 | 1.5 | | positive | 4/100 |
| 45 | 100.0 | 2.0 | 1.0(Ho) | 100.0 | 3.0 | 1.5 | 1.3 | 1.5 | | positive | 9/100 |

As shown in Table 2, as a rare earth element included in dielectric layer 12, La was used in the multilayer ceramic capacitors of Sample Nos. 31 to 41, Gd was used in the multilayer ceramic capacitor of Sample No. 42, Nd was used in the multilayer ceramic capacitor of Sample No. 43, Dy was used in the multilayer ceramic capacitor of Sample No. 44, and Ho was used in the multilayer ceramic capacitor of Sample No. 45. Although not shown in Table 2, all multilayer ceramic capacitors comprise dielectric layer 12 with 2 parts by mole of Hf included therein relative to 100 parts by mole of Zr.

In a process of manufacturing the multilayer ceramic capacitors of Sample Nos. 31 to 45, it has been examined whether sintering can be done to achieve a target grain size for a given firing temperature. A sample successfully sintered to achieve the target grain size is indicated as positive, which means satisfactory stability in fireability, whereas a sample unsuccessfully sintered to achieve the target grain size is indicated as negative, which means unsatisfactory stability in fireability (see table 2). The multilayer ceramic capacitors are evaluated in reliability in the same method as the multilayer ceramic capacitors of Sample Nos. 1 to 27 shown in Table 1 are evaluated in reliability.

The multilayer ceramic capacitors of Sample Nos. 31 to 45 shown in Table 2 are multilayer ceramic capacitors of the present embodiment, and satisfy the requirement that the dielectric layer includes a plurality of dielectric grains including Ca, Zr, Ti and a rare earth element, P is present between the plurality of dielectric grains, and where at least a portion of the rare earth element is in a solid solution in the dielectric grains. Among them, the multilayer ceramic capacitors of Sample Nos. 31 to 35, 37, 40, and 42 to 45 having a Si content of 0.1 parts by mole to 5.0 parts by mole and a Mn content of 0.2 parts by mole to 5.0 parts by mole relative to 100 parts by mole of Zr were satisfactorily stable in fireability, and were also highly reliable as they each had 13 or less samples determined as failure out of 100 samples in a reliability evaluation.

That is, multilayer ceramic capacitor 10 of the present embodiment preferably comprises dielectric layer 12 further including Si and Mn with a Si content of 0.1 parts by mole to 5.0 parts by mole and a Mn content of 0.2 parts by mole to 5.0 parts by mole relative to 100 parts by mole of Zr.

Furthermore, a result is obtained indicating that when the multilayer ceramic capacitor of Sample No. 31 using La as a rare earth element is compared with the multilayer ceramic capacitors of Sample Nos. 42, 43, 44, and 45 having the same composition ratio other than the rare earth element and using Gd, Nd, Dy, and Ho, respectively, as the rare earth element, the latter were also satisfactorily stable in fireability and also highly reliable.

The present invention is not limited to the above embodiments, and various applications and modifications can be made within the scope of the present invention.

While the present invention has been described in embodiments, it should be understood that the embodiments disclosed herein are illustrative and non-restrictive in any respect. The scope of the present invention is defined by the terms of the claims, and is intended to include any modifications within the meaning and scope equivalent to the terms of the claims.

What is claimed is:

1. A multilayer ceramic capacitor comprising:
   a ceramic body including a stack of a plurality of dielectric layers and a plurality of internal electrodes and having a first major surface and a second major surface opposite to each other in a layer stacking direction, a first side surface and a second side surface opposite to each other in a widthwise direction orthogonal to the layer stacking direction, and a first end surface and a second end surface opposite to each other in a lengthwise direction orthogonal to the layer stacking direction and the widthwise direction;
   a first external electrode on the first end surface of the ceramic body and electrically connected to a first set of the plurality of internal electrodes; and
   a second external electrode on the second end surface of the ceramic body and electrically connected to a second set of the plurality of internal electrodes, wherein
   the dielectric layer includes a plurality of dielectric grains including Ca, Zr, Ti and a rare earth element, P is present between the plurality of dielectric grains, and where at least a portion of the rare earth element is in a solid solution in the dielectric grains.

2. The multilayer ceramic capacitor according to claim 1, wherein the dielectric layer includes, relative to 100 parts by mole of the Zr, the P in an amount of 0.001 parts by mole to 11 parts by mole.

3. The multilayer ceramic capacitor according to claim 1, wherein the dielectric layer includes, relative to 100 parts by mole of the Zr:
   the Ca in an amount of 70 parts by mole to 107 parts by mole;
   Sr in an amount of 0 parts by mole to 26 parts by mole;
   the rare earth element in an amount of 0.1 parts by mole to 5 parts by mole;
   the Ti in an amount of 0.1 parts by mole to 6 parts by mole;
   Hf in an amount of 1 part by mole to 3 parts by mole; and
   the P in an amount of 0.001 parts by mole to 11 parts by mole.

4. The multilayer ceramic capacitor according to claim 1, wherein the rare earth element is at least one of La, Ce, Pr, Pm, Sm, Eu, Tb, Gd, Nd, Dy, Ho, and Y.

5. The multilayer ceramic capacitor according to claim 1, wherein the rare earth element is La.

6. The multilayer ceramic capacitor according to claim 1, wherein the dielectric layer further includes Sr.

7. The multilayer ceramic capacitor according to claim 1, wherein the P is present at a grain boundary triple junction of at least three of the dielectric grains and a grain boundary.

8. The multilayer ceramic capacitor according to claim 1, wherein the dielectric layer further includes Si and Mn.

9. The multilayer ceramic capacitor according to claim 1, wherein
the dielectric layer further includes Si and Mn, and relative to 100 parts by mole of Zr,
a content of the Si is 0.1 parts by mole to 5.0 parts by mole, and
a content of the Mn is 0.2 parts by mole to 5.0 parts by mole.

10. The multilayer ceramic capacitor according to claim 1, wherein the multilayer ceramic capacitor has any one of:
a first size having a dimension of 0.35 mm to 0.65 mm in the layer stacking direction, a dimension of 0.35 mm to 0.65 mm the widthwise direction, and a dimension of 0.85 mm to 1.15 mm in the lengthwise direction;
a second size having a dimension of 1.45 mm to 1.70 mm in the layer stacking direction, a dimension of 1.45 mm to 1.70 mm in the widthwise direction, and a dimension of 3.05 mm to 3.35 mm in the lengthwise direction; and
a third size having a dimension of 2.35 mm to 2.65 mm in the layer stacking direction, a dimension of 2.35 mm to 2.65 mm in the widthwise direction, and a dimension of 3.05 mm to 3.35 mm in the lengthwise direction.

11. The multilayer ceramic capacitor according to claim 10, wherein a number of the plurality of internal electrodes are 100 to 550 for the first size, a number of the plurality of internal electrodes are 230 to 830 for the second size, and a number of the plurality of internal electrodes are 230 to 1,520 for the third size.

12. The multilayer ceramic capacitor according to claim 1, wherein the dielectric layer has a dimension of 0.3 μm to 3.0 μm in the layer stacking direction.

13. The multilayer ceramic capacitor according to claim 1, wherein the dielectric grains have an average grain diameter of 100 nm or more and a size of 80% or less of a dimension of the dielectric layer in the layer stacking direction.

14. The multilayer ceramic capacitor according to claim 1, wherein the internal electrodes include a ceramic material identical to a dielectric ceramic material included in dielectric layers as a co-material.

* * * * *